US 12,475,921 B1

(12) United States Patent
Eguchi et al.

(10) Patent No.: US 12,475,921 B1
(45) Date of Patent: Nov. 18, 2025

(54) HARD DISK DRIVE VOICE COIL MOTOR ACTUATOR WITH LOW-DENSITY WIRE COIL AND HIGH-DENSITY COIL STIFFENER

(71) Applicant: Western Digital Technologies, Inc., San Jose, CA (US)

(72) Inventors: Takehiko Eguchi, Tokyo (JP); Hajime Eguchi, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/939,059

(22) Filed: Nov. 6, 2024

(51) Int. Cl.
*G11B 5/55* (2006.01)
*G11B 5/48* (2006.01)

(52) U.S. Cl.
CPC .......... *G11B 5/5573* (2013.01); *G11B 5/4813* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 3,743,794 A * | 7/1973 | Miller, III | H02K 41/0356 360/266.8 |
| 5,905,608 A * | 5/1999 | Frees | G11B 5/5521 360/265.9 |
| 6,480,364 B1 | 11/2002 | Thanomsat et al. | |
| 6,867,950 B1 * | 3/2005 | Lin | G11B 5/4813 |
| 7,215,496 B1 * | 5/2007 | Kupferman | G11B 5/59616 |
| 7,675,714 B1 | 3/2010 | Yucesan et al. | |
| 8,305,714 B2 | 11/2012 | Suzuki et al. | |
| 2003/0081356 A1 * | 5/2003 | Shimizu | G11B 5/5526 360/265.9 |
| 2007/0014052 A1 * | 1/2007 | Kim | G11B 5/4813 29/603.03 |
| 2007/0188903 A1 * | 8/2007 | Kim | G11B 27/36 360/77.08 |
| 2008/0013217 A1 * | 1/2008 | Lee | G11B 25/043 |

(Continued)

OTHER PUBLICATIONS

Unknown, Ceramic coil stiffener for higher coil stiffness and better heat radiation, IP.com, Feb. 17, 2002, 2 pp., IBM TDB Archive, United States.

(Continued)

*Primary Examiner* — Peter Vincent Agustin
(74) *Attorney, Agent, or Firm* — John D. Henkhaus

(57) ABSTRACT

A voice coil motor assembly (VCMA), such as for a hard disk drive, includes a low-density voice coil and a high-density coil stiffener disposed inside the coil of wire. The low-density voice coil, utilizing copper-clad aluminum or aluminum wire, is configured to increase the second coil torsion mode frequency of the VCMA, thereby bringing it closer to the second torsion mode frequency of the actuator arms. In conjunction, the high-density stiffener, utilizing steel or copper or zinc, is configured to increase the mass of the VCMA to compensate for the lower-density wire in regard to the center of mass of the VCMA about its axis of rotation. In viewing under customer box vibration conditions and in terms of position error signals (PES), a non-trivial peak in the PES spectrum due to the second coil torsion mode is largely eliminated, and the power of PES is reduced to about half.

20 Claims, 5 Drawing Sheets

(56) References Cited

U.S. PATENT DOCUMENTS

| | | | |
|---|---|---|---|
| 2008/0291563 A1 | 11/2008 | Obregon et al. | |
| 2008/0310054 A1 | 12/2008 | Fu et al. | |
| 2009/0046392 A1 | 2/2009 | Xu et al. | |
| 2014/0139953 A1* | 5/2014 | Hatch | G11B 5/4873 360/234.5 |
| 2015/0138674 A1* | 5/2015 | Keshavan | G11B 5/5582 360/234.3 |
| 2024/0274159 A1* | 8/2024 | Park | G11B 5/5521 |

OTHER PUBLICATIONS

Puengkhom, Vana et al., On Finite Element Modeling Aspect of HDD's Head Stack Assembly Vibration Analysis, The 5th TSME International Conference on Mechanical Engineering, Dec. 17-19, 2014, The Empress, Chiang Mai, 8 pp., ResearchGate.

Atsumi, Takenori et al., Vibration control with thin-film-coil actuator for head-positioning system in hard disk drives, Journal of Advanced Mechanical Design, Systems, and Manufacturing, pp. 1-12, Bulletin of the JSME vol. 9, No. 1, 2015, The Japan Society of Mechanical Engineers.

Suzuki, Kenji et al., VCM design with round coil and axe-shaped magnet for hard disk drive actuator, Microsyst Technol (2007) 13:1093-1101, / Accepted: Oct. 30, 2006 / Published online: Dec. 1, 2006, pp. 1093-1101, Springer-Verlag.

* cited by examiner

HARD DISK DRIVE VOICE COIL MOTOR ACTUATOR WITH LOW-DENSITY WIRE COIL AND HIGH-DENSITY COIL STIFFENER

FIELD OF EMBODIMENTS

Embodiments of the invention may relate generally to data storage devices such as hard disk drives and particularly to approaches for improving the structural dynamics of the voice coil motor assembly in a hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

An HDD includes at least one head gimbal assembly (HGA) that generally includes a slider that houses the read-write head and a suspension. Each slider is attached to the free end of a suspension that, in turn, is cantilevered from the rigid arm of an actuator. Several actuator arms may be combined to form a single movable unit, a head stack assembly (HSA), typically having a rotary pivotal bearing system. The suspension of a conventional HDD typically includes a relatively stiff load beam with a mount plate at its base end, which attaches to the actuator arm, and whose free end mounts a flexure that carries the slider and its read-write head.

As networked computing systems grow in numbers and capability, there is a need for more data storage system capacity. Cloud computing and large-scale data processing further increase the need for digital data storage systems that are capable of transferring and holding significant amounts of data. To that end, increasing the storage capacity of HDDs is one of the ongoing goals of HDD technology evolution. In contemporary HDDs, operational vibration (also referred to as "customer box vibration") is one of the most significant contributors to track misregistration (TMR), where TMR generally refers to where a track-following/servoing head is relative to where it is supposed to be, i.e., the variance of the deviation of the read-write head from the center of a data track. Key contributors to operational vibration are (a) acoustic excitation caused by air pressure fluctuations from cooling fans, and (b) structurally transmitted external vibration.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
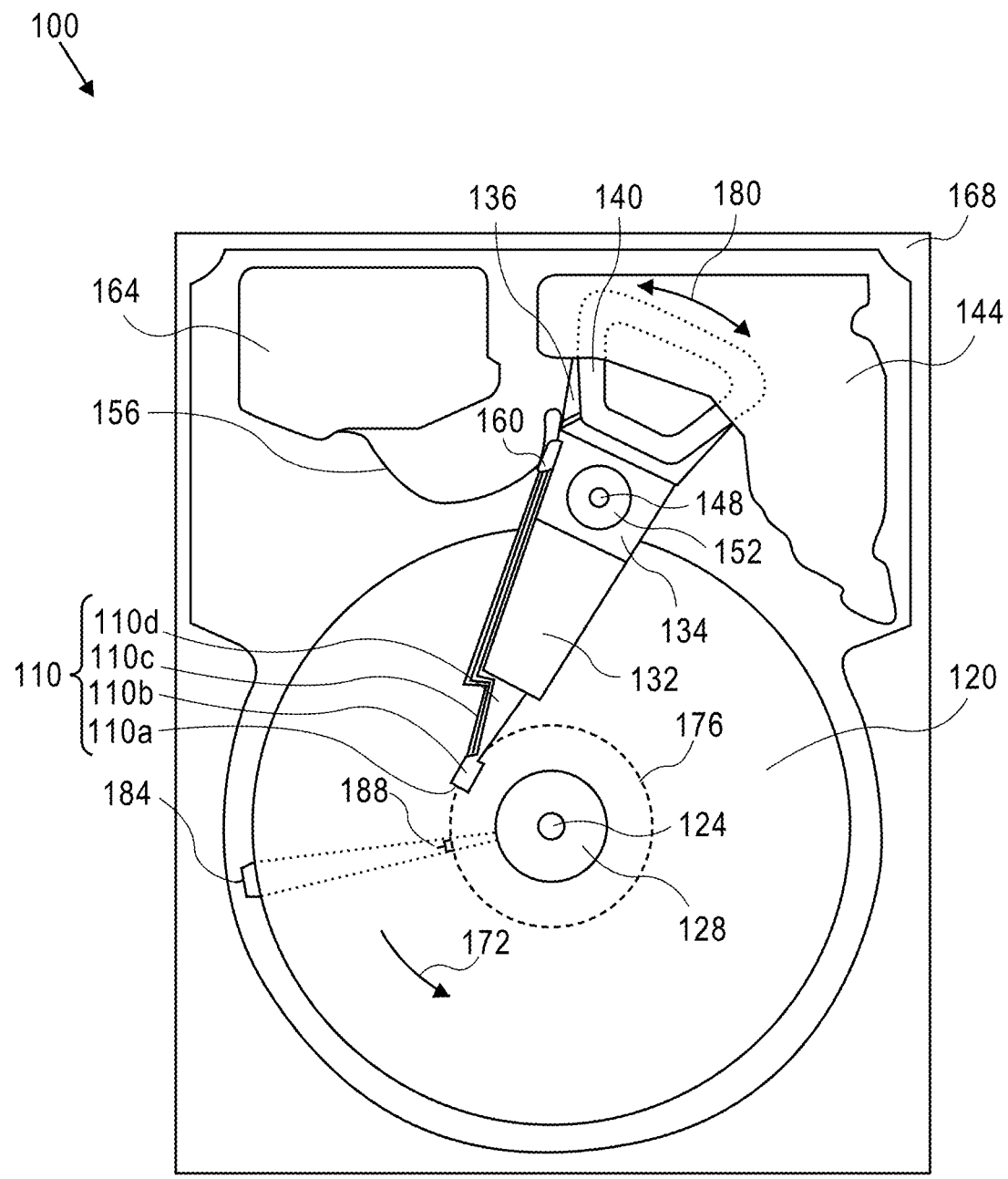
FIG. 1 is a plan view illustrating a hard disk drive (HDD), according to an embodiment.

Generally, approaches to improving the structural dynamics of an actuator system in a hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like are intended to mean that the particular feature, structure, or characteristic being described is included in at least one embodiment of the invention. However, instances of such phrases do not necessarily all refer to the same embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the structure is vertical for all practical purposes but may not be precisely at 90 degrees throughout.

While terms such as "optimal", "optimize", "minimal", "minimize", "maximal", "maximize", and the like may not have certain values associated therewith, if such terms are used herein, the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that operational vibration in the context of a hard disk drive (HDD) is a significant contributor to track misregistration (TMR), and that key contributors to operational vibration are (a) acoustic excitation caused by air pressure fluctuations from cooling fans, and (b) structurally transmitted external vibration. The customer box operational vibration issue due to loud noise generated by the cooling-fan subsystem in customer boxes is considered a significant challenge with respect to head positioning of, for example, helium-sealed HDDs. Coil torsion modes of the voice coil motor (VCM) assembly of a VCM actuator are major contributors to the position error signal (PES) in the customer box vibration environment. In typical 3.5" HDDs, the second coil torsion mode, whose natural frequency is from 6 to 7 kHz (kiloHertz), has the largest response gain to the external excitations caused by the fan noise. Thus, suppressing the gain of the second coil torsion mode is an ongoing challenge in dynamics design of the VCM actuator.

One known approach to managing the structural dynamics of VCM actuators includes the use of arm dampers, a mechanical measure to suppress response gains of the actuator. For example, a constrained-layer damper typically consists of a viscoelastic material and a thin metal plate and is attached to a surface of each arm. However, because the coil torsion modes involve not only deformations of arms but also coil and pivot bearings, the effect of an arm damper on the coil torsion modes is limited. Another known approach to this issue includes the use of adaptive filters, a measure in the servo control system. In a noisy customer environment, peak filters are typically added into the servo controller adaptively to suppress prominences in the frequency spectrum of the PES.

Figure 2:
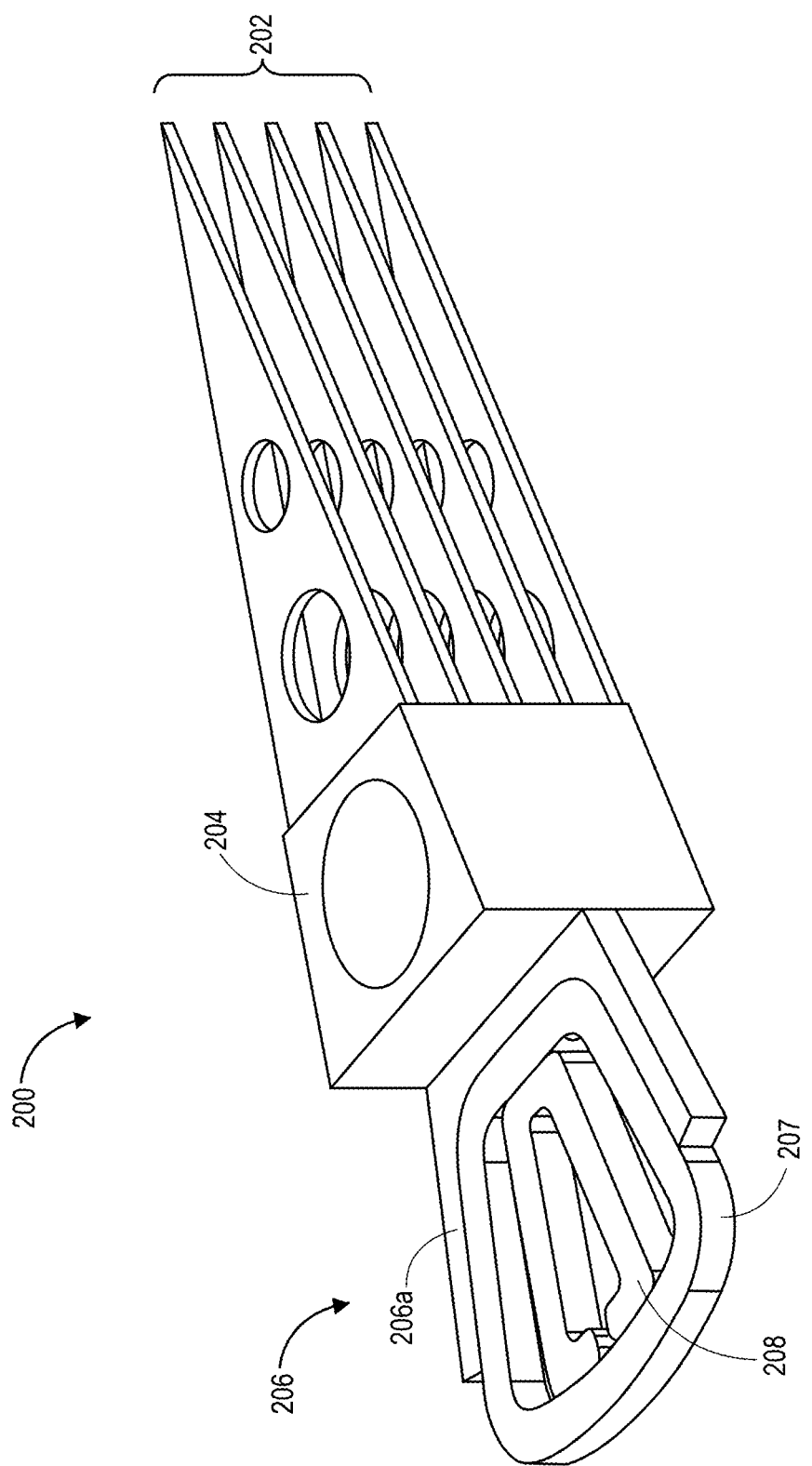
FIG. 2 is a perspective view illustrating a voice coil motor (VCM) assembly, according to an embodiment.

FIG. 2 is a perspective view illustrating a voice coil motor assembly, according to an embodiment. Voice coil motor (VCM) assembly 200 (simply "VCM assembly 200") comprises multiple arms 202 (see also, e.g., arm 132 of FIG. 1), a carriage 204 (see also, e.g., carriage 134 of FIG. 1), and a voice coil assembly (VCA) 206. The VCA 206 includes an armature 206a (see also, e.g., armature 136 of FIG. 1) attached to the carriage 204 and housing a voice coil 207 (see also, e.g., voice coil 140 of FIG. 1), and the VCM further comprises a stator (not shown here; see, e.g., stator 144 of FIG. 1) including a voice coil magnet. As depicted and according to an embodiment, the VCA 206 of VCM assembly 200 further comprises a coil stiffener 208 positioned inside of the structure of the voice coil 207, typically employed to add stiffness to the voice coil 207. The VCM is configured to move the arms 202, and an attached head gimbal assembly (HGA) (not visible here; see, e.g., HGA 110 of FIG. 1), to access portions of a corresponding disk stack (see, e.g., recording media 120 of FIG. 1). These components (except the stator 144) are collectively mounted on a pivot shaft (not shown here; see, e.g., pivot shaft 148 of FIG. 1) with an interposed pivot bearing assembly (not shown here; see, e.g., pivot bearing assembly 152 of FIG. 1). Acoustic excitation applied to the HDD enclosure surfaces (e.g., base and/or cover) is transmitted through the pivot shaft to the pivot bearings and the VCA 206, eventually displacing the read-write heads. Such displacement of the read-write heads can be represented in a transfer function diagram/plot. Thus, there is a need to address acoustic-driven vibrations of an HDD in the customer box environment.

Figure 3A:
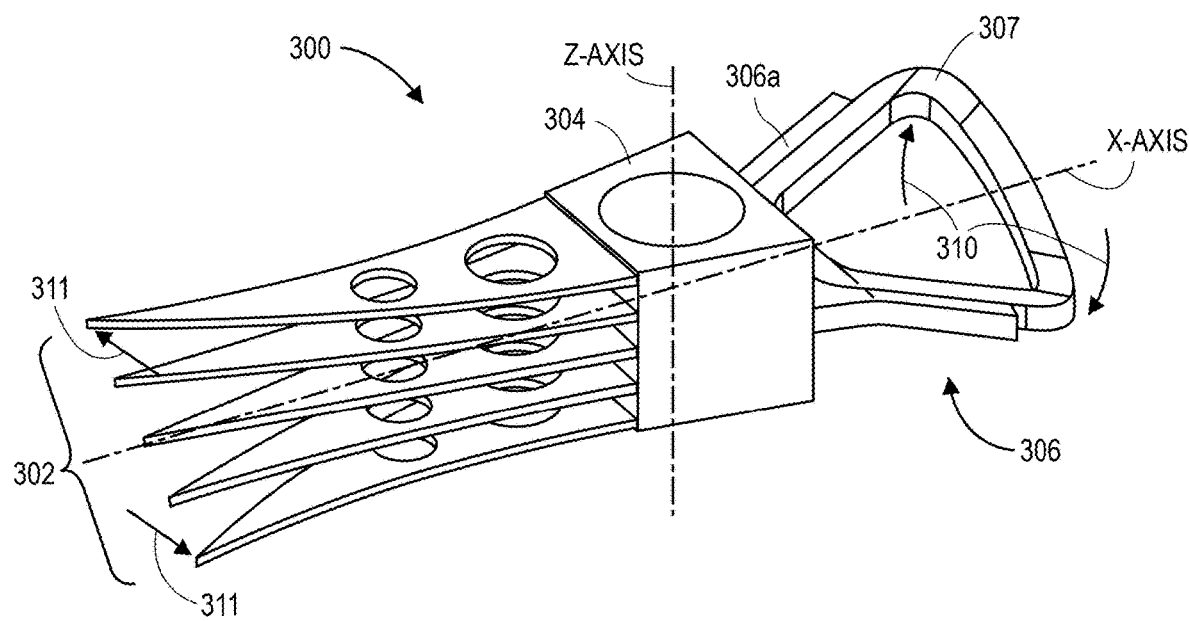
FIG. 3A is a perspective view illustrating structural dynamics of a VCM assembly.

FIG. 3A is a perspective view illustrating structural dynamics of a voice coil motor assembly. Coil torsion modes are simply explained with the three-body model. Thus, voice coil motor (VCM) assembly 300 (simply "VCM assembly 300") is characterized by a carriage 304 (see also, e.g., carriage 134 of FIG. 1), with which one or more arms 302 (see also, e.g., arm 132 of FIG. 1) and a voice coil assembly (VCA) 306 are coupled. The VCA 306 includes a coil support armature 306a (see also, e.g., armature 136 of FIG. 1) attached to the carriage 304 and housing a voice coil 307 (see also, e.g., voice coil 140 of FIG. 1), and the VCM further comprises a stator (not shown here; see, e.g., stator 144 of FIG. 1) including a voice coil magnet. The VCM is configured to rotate about a z-axis ("rotating axis") to move the arms 302, and an attached head gimbal assembly (not visible here; see, e.g., HGA 110 of FIG. 1), to access portions of a corresponding disk stack (see, e.g., recording media 120 of FIG. 1). These components (except the stator 144) are collectively mounted on a pivot shaft (not shown here; see, e.g., pivot shaft 148 of FIG. 1) with an interposed pivot bearing assembly (not shown here; see, e.g., pivot bearing assembly 152 of FIG. 1). Here also, acoustic excitation applied to the HDD enclosure surfaces (e.g., base and/or cover) is transmitted through the pivot shaft to the pivot bearings and the VCM assembly 300, eventually displacing the read-write heads.

FIG. 3A further depicts an x-axis ("coil torsion axis"), whereby the structural dynamics torsion mode of the VCA 306 is about this coil torsion axis. Here, the dynamics of the torsion mode of the VCA 306 is represented in simplified form by the arrows 310. Further depicted is arm (sway) mode represented in simplified form by the arrows 311.

Figure 3B:
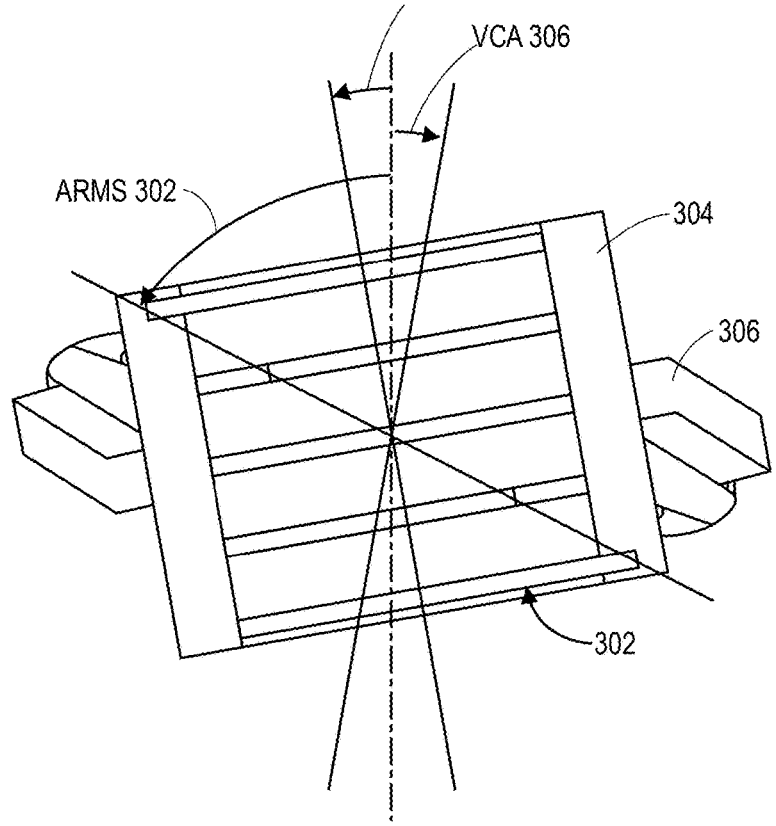
FIG. 3B is a diagram view illustrating a second coil torsion mode of the VCM assembly of FIG. 3A.

The coil torsion modes are simply explained by the motions of the three components: (i) the VCA 306, (ii) the carriage 304 (including pivot bearing), and (iii) arms 302. For a $1^{st}$ (first) coil torsion mode, the carriage 304, VCA 306, and arms 302 are tilting to the same side/direction (e.g., clockwise). For a $2^{nd}$ (second) coil torsion mode, the carriage 304 and arms 302 are tilting to the same side/direction (e.g., counter-clockwise), while the VCA 306 is tilting to the opposite side/direction (e.g., clockwise). For a $3^{rd}$ (third) coil torsion mode, the VCA 306 and arms 302 are tilting to the same side/direction (e.g., clockwise), while the carriage 304 is tilting to the opposite side/direction (e.g., counter-clockwise). FIG. 3B is a diagram view illustrating a second coil torsion mode of the VCM assembly of FIG. 3A. This view shows the carriage 304 and arms 302 tilting counter-clockwise while the VCA 306 is tilting clockwise. Thus, the second coil torsion mode consists of a torsion mode of the coil assembly (e.g., VCA 306), tilt motion as a rigid-body of the carriage part (e.g., carriage 304), and the arm (e.g., arms 302) sway mode, where the former two have a lower frequency which is typically 4-6 kHz lower than the arm sway mode.

Low-Density Voice Coil

To reiterate, the customer box operational vibration issue due to loud noise generated by the cooling-fan subsystem in customer boxes is considered a significant challenge with respect to head positioning in HDDs. Coil torsion modes of the VCM assembly of a VCM actuator are major contributors to the PES in the customer box vibration environment and, in typical 3.5" HDDs, the second coil torsion mode (whose natural frequency is from 6 to 7 kHz) has the largest response gain to the external excitations caused by the fan noise. According to embodiments, a technical goal is frequency matching of the torsion mode of the coil part (e.g., VCA 206, 306 of FIGS. 2-3B) and the arm (sway) mode. As previously noted, the second coil torsion mode is a combination of three modes and, as such, has a lower frequency than the highest frequency component (i.e., the arm mode). Because the arm mode frequency is relatively high (e.g., due to the shape of the arm and the weight of the suspensions mounted at the tip of the arms), increasing the frequency of the torsion mode of the coil part to bring it closer to the frequency of the arm mode is an objective, according to embodiments.

Figure 4:
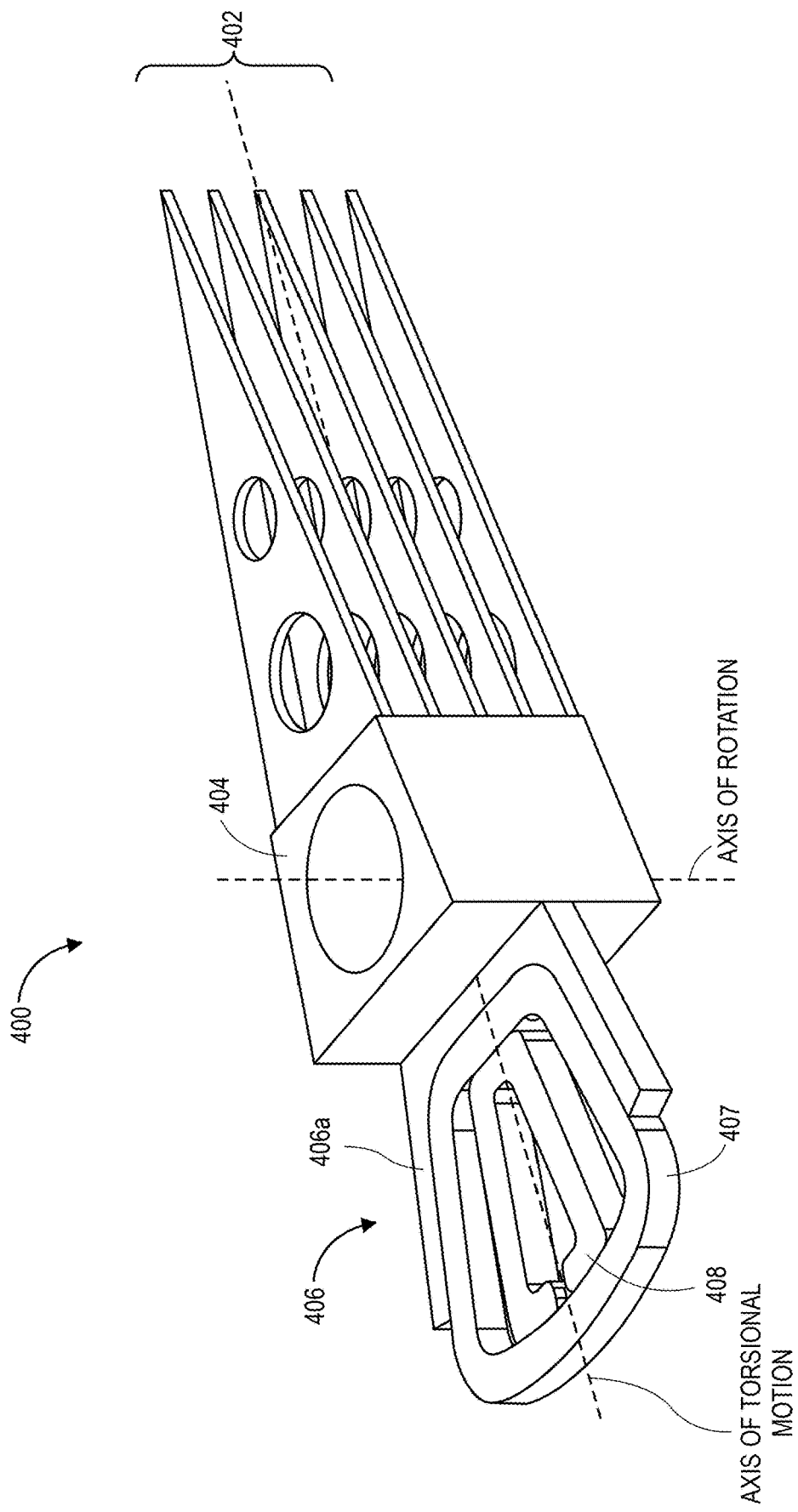
FIG. 4 is a perspective view illustrating a VCM assembly, according to an embodiment.

FIG. 4 is a perspective view illustrating a VCM assembly, according to an embodiment. FIG. 4 illustrates a voice coil motor (VCM) assembly 400 (simply "VCM assembly 400") configured for installation and operation in a hard disk drive (HDD) such as conventional HDD 100 (FIG. 1) comprising disk media mounted on a spindle (not shown here; see, e.g., recording medium 120 of FIG. 1), a head slider housing a read-write transducer (not shown here; see, e.g., slider 110*b* that includes a magnetic read-write head 110*a* of FIG. 1) configured to read from and to write to a disk medium of the disk media, and the rotary actuator assembly shown here, i.e., VCM assembly 400, configured for moving the head slider about a pivot (see also, e.g., pivot shaft 148 with an interposed pivot bearing assembly 152 of FIG. 1) to access portions of the disk medium.

According to embodiments, VCM assembly 400 comprises multiple arms 402 (see also, e.g., arm 132 of FIG. 1), a carriage 404 (see also, e.g., carriage 134 of FIG. 1), and a voice coil assembly (VCA) 406. The VCA 406 includes an armature 406*a* (see also, e.g., armature 136 of FIG. 1) attached to the carriage 404 and housing a voice coil 407 (see also, e.g., voice coil 140 of FIG. 1) comprising a coil of wire, where the wire has a first density. The VCM further comprises a stator (not shown here; see, e.g., stator 144 of FIG. 1) including a voice coil magnet. As depicted, the VCA 406 of VCM assembly 400 further comprises a coil stiffener 408 positioned inside of the structure of the voice coil 407 where, according to one or more embodiments, the stiffener 408 comprises a material having a second density greater than the first density. Thus, the wire constituent to the voice coil 407 is composed of a relatively low-density material while the stiffener 408 is composed is of a relatively high-density material. As such, the voice coil 407 is configured to increase a torsion mode frequency of the VCA 406 relative to a torsion mode frequency of an otherwise conventional voice coil (e.g., copper wire) and assembly comprising wire having a density higher than the first density.

According to one or more embodiments, the wire of voice coil 407 is composed of a material from a group consisting of copper-clad aluminum wire (CCAW) and aluminum wire. Usually, natural frequencies of the arm mode are significantly higher than the torsion mode frequencies of the voice coil assembly, and the second coil torsion mode has the largest contribution in PES spectrum under noisy customer box condition. Because the CCAW (or aluminum wire) voice coil 407 is lighter than a conventional copper coil, the torsion mode frequencies of voice coil 407 (and similarly the VCA 406) with a CCAW (or aluminum wire) coil are higher than the conventional copper coil. Therefore, in a scenario in which the second torsion mode frequency of VCA 406 is substantially close to the frequency of the arm, the response gain of the second coil torsion mode to external excitations becomes small.

High-Density Coil Stiffener

While implementation of the low-density voice coil 407 may provide the foregoing benefits as described, such a configuration may undesirably affect the center of mass of the VCA 406, such as by degrading the HDD performance under vibration conditions. Thus, according to one or more embodiments, in conjunction with implementation of the low-density ("first density") voice coil 407, the high-density ("second density") coil stiffener 408 is implemented. As such, the stiffener 408 having the higher density is configured to increase the mass of the VCM assembly to compensate for the wire of voice coil 407 having the lower density, in the context of the center of mass of the VCM assembly about its axis of rotation, as represented in FIG. 4. According to one or more embodiments, the stiffener material is composed of a material from a group consisting of stainless steel, copper or copper alloy, and zinc-aluminum alloy. For a non-limiting example, an austenitic stainless steel such as SUS304 and SUS305 may be utilized, where SUS305 has better stability to machining than SUS304. The role of stiffener 408 in the described embodiments is, generally, its mass rather than its stiffness. Therefore, the stiffener 408 may be composed of other materials, such as naval brass or plastic-metal composite material for non-limiting examples. Because the low-density voice coil 407 and high-density stiffener 408 are assembled by adhesion, preferably the coefficient of thermal expansion (CTE) of the stiffener 408 material is substantially close to or equivalent to the CTE of the wire of voice coil 407 to avoid cracking of the adhesive.

As depicted in FIG. 4 and according to one or more embodiments, the high-density stiffener 408 is positioned radially inside the coil of wire of voice coil 407 such that the center of mass of the stiffener 408 in a direction opposing an axis of torsional motion is substantially near the axis of torsional motion. Because the mass of the high-density stiffener 408 is positioned near the axis of torsional motion, the high-density stiffener 408 has minimal effect on the coil torsion mode frequency while effectively compensating for the center of mass of the VCM actuator assembly.

Method of Manufacturing a Voice Coil Motor Assembly

Figure 5:
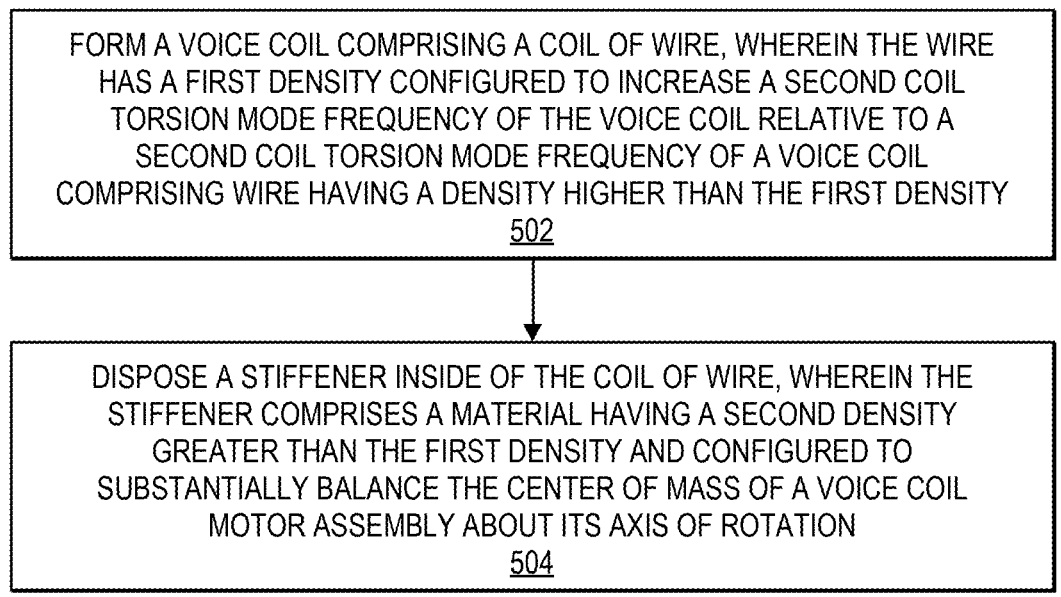
FIG. 5 is a flow diagram illustrating a method of manufacturing a voice coil motor assembly, according to an embodiment.

FIG. 5 is a flow diagram illustrating a method of manufacturing a voice coil motor assembly, according to an embodiment. A voice coil motor assembly (VCMA) assembled, manufactured, produced according to the method of FIG. 5 is designed, configured, intended for implementation into a hard disk drive (HDD) (see, e.g., FIG. 1). However, other implementation contexts are not excluded.

At block 502, form a voice coil comprising a coil of wire, wherein the wire has a first density configured to increase a second coil torsion mode frequency of the voice coil motor assembly relative to a second coil torsion mode frequency of a voice coil motor assembly comprising a voice coil comprising wire having a density higher than the first density. For example, low-density voice coil 407 (FIG. 4) is formed comprising a coil of CCAW or aluminum wire, wherein the low-density wire has a first density configured to increase the second coil torsion mode frequency of the VCMA relative to a second coil torsion mode frequency of a VCMA comprising a voice coil comprising wire having a density higher than the first density, such as a copper wire coil.

At block 504, dispose a stiffener inside of the coil of wire, wherein the stiffener comprises a material having a second density greater than the first density and configured to substantially balance the center of mass of the voice coil motor assembly about its axis of rotation. For example, high-density stiffener 408 (FIG. 4) is disposed inside of the coil of wire of voice coil 407, wherein the stiffener 408 comprises steel, copper, or zinc and is configured to substantially balance the center of mass of the VCMA about its axis of rotation, e.g., about the pivot shaft 148 (FIG. 1) and pivot bearing assembly 152 (FIG. 1).

A voice coil motor actuator implementation with, for example, a CCAW coil and a stainless-steel stiffener, can realize a small response gain of the second coil torsion mode of a VCMA while minimizing any impacts on performance of the actuator. When the torsion mode frequency and arm mode frequency are substantially coincident, tilt motion of the body in the second coil torsion mode becomes nearly zero. In this case, this mode is not excited by the external vibrations via the pivot shaft because the center of mass and principal axis of inertia are largely unaffected by the combination of low-density voice coil and high-density coil stiffener. When customer box vibration conditions are viewed and analyzed in terms of position error signals (PES), a significant peak in the PES spectrum due to the second coil torsion mode of prior approaches (e.g., copper coil with aluminum stiffener) is largely if not completely eliminated, and the power of PES is reduced to about half of the prior approach. In view of the foregoing, HDD operational vibration performance is considered improved under noisy customer box conditions. Furthermore, because the outer shape of the actuator and the dynamics are left largely the same as with prior approach, any impacts to the design of other mechanical parts and other performances are minimized.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD and likewise a multi-actuator HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120, but commonly multiple recording media 120, rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134 to which arm 132 is attached, a voice coil motor (VCM) that includes an armature 136 housing a voice coil 140 and attached to the carriage 134, and a stator 144 including a voice-coil magnet (not visible). The VCM is configured to move the arm 132 and the HGA 110 to access portions of the medium 120. These components (except the stator 144) are collectively mounted on a pivot shaft 148 with an interposed pivot bearing assembly 152. In the case of an HDD having multiple disks, the carriage 134 may be referred to as an "E-block" or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a* are transmitted by a flexible cable assembly (FCA) 156 (or "flex cable", or "flexible printed circuit" (FPC)). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover (removed here to show internal components), provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM, and the head 110*a* of the HGA 110. The electrical signal provided to the drive motor enables the drive motor to spin, providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without contacting a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position error signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller (HDC), an interface controller, an arm electronics module, a data channel, a motor driver, a servo processor, buffer memory, etc. Two or more of such components may be combined on a single integrated circuit board referred to as a "system on a chip" (SOC). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management, and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O (input/output) intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps and are not intended to specify or require a particular order of carrying out such steps.

What is claimed is:

1. A data storage device comprising:
   disk media rotatably mounted on a spindle;
   a head slider comprising a read-write head configured to write to and to read from a disk medium of the disk media; and
   a rotary actuator configured to move the head slider about a pivot to access portions of the disk medium via actuation by a voice coil motor (VCM) assembly, the VCM assembly comprising:
      a voice coil comprising a coil of wire, the wire having a first density, and
      a stiffener disposed inside the coil of wire, the stiffener comprising a material having a second density greater than the first density.

2. The data storage device of claim 1, wherein the voice coil is configured to increase a frequency of a torsion mode of the VCM assembly relative to a frequency of a torsion mode of a VCM assembly comprising wire having a density higher than the first density.

3. The data storage device of claim 2, wherein:
   the VCM assembly further comprises a plurality of arms extending from a carriage; and
   the torsion mode of the VCM assembly is a second coil torsion mode of the VCM assembly corresponding to a structural dynamics mode in which the carriage and the plurality of arms tilt in one direction and the VCM assembly tilts in an opposing direction.

4. The data storage device of claim 3, wherein the voice coil is configured to bring a frequency of the second coil torsion mode of the VCM assembly closer to a frequency of a second coil torsion mode of the plurality of arms.

5. The data storage device of claim 1, wherein the stiffener material having the higher second density is configured to increase the mass of the VCM assembly to compensate for the wire having the lower first density, in regard to the center of mass of the VCM assembly about its axis of rotation.

6. The data storage device of claim 5, wherein the stiffener is positioned inside the coil of wire such that the center of mass of the stiffener in a direction opposing an axis of torsional motion is substantially near the axis of torsional motion.

7. The data storage device of claim 1, wherein:
   the wire is composed of a material from a group consisting of (i) copper-clad aluminum and (ii) aluminum; and
   the stiffener material is composed of a material from a group consisting of (i) stainless steel, (ii) copper or copper alloy, and (iii) zinc-aluminum alloy.

8. A voice coil motor (VCM) assembly comprising:
   a voice coil comprising a coil of wire, the wire having a first density; and
   a stiffener disposed inside the coil of wire, the stiffener comprising a material having a second density greater than the first density.

9. The VCM assembly of claim 8, wherein the voice coil is configured to increase a torsion mode frequency of the VCM assembly relative to a torsion mode frequency of a VCM assembly comprising a voice coil comprising wire having a density higher than the first density.

10. The VCM assembly of claim 9, further comprising:
a plurality of arms extending from a carriage; and
wherein the torsion mode is a second coil torsion mode of the VCM assembly corresponding to a structural dynamics mode in which the carriage and the plurality of arms tilt in one direction and the voice coil tilts in an opposing direction.

11. The VCM assembly of claim 10, wherein the voice coil is configured to bring a frequency of the second coil torsion mode of the VCM assembly closer to a frequency of a second coil torsion mode of the plurality of arms.

12. The VCM assembly of claim 8, wherein the stiffener material having the higher second density is configured to increase the mass of the VCM assembly to compensate for the wire having the lower first density, in regard to the center of mass of the VCM assembly about its axis of rotation.

13. The VCM assembly of claim 12, wherein the stiffener is positioned inside the coil of wire such that the center of mass of the stiffener in a direction opposing an axis of torsional motion is substantially near the axis of torsional motion.

14. The VCM assembly of claim 8, wherein:
the wire is composed of a material from a group consisting of (i) copper-clad aluminum and (ii) aluminum.

15. The VCM assembly of claim 14, wherein:
the stiffener material is composed of a material from a group consisting of (i) stainless steel, (ii) copper or copper alloy, and (iii) zinc-aluminum alloy.

16. A hard disk drive comprising the VCM assembly of claim 15.

17. A method of manufacturing a voice coil motor assembly, the method comprising:
forming a voice coil comprising a coil of wire, wherein the wire has a first density configured to increase a frequency of a second coil torsion mode of the voice coil motor assembly relative to a frequency of a second coil torsion mode of a voice coil motor assembly comprising a voice coil comprising wire having a density higher than the first density; and
disposing a stiffener inside of the coil of wire, wherein the stiffener comprises a material having a second density greater than the first density and configured to substantially balance the center of mass of the voice coil motor assembly about its axis of rotation.

18. The method of claim 17, wherein:
forming the voice coil includes forming with a wire material from a group consisting of (i) copper-clad aluminum and (ii) aluminum; and
disposing the stiffener includes disposing stiffener material composed of a material from a group consisting of (i) stainless steel, (ii) copper or copper alloy, and (iii) zinc-aluminum alloy.

19. A hard disk drive (HDD) comprising:
disk media rotatably mounted on a spindle;
means for reading from and writing to a disk medium of the disk media; and
a rotary actuator configured to move the means for reading and writing to access portions of the disk medium via actuation by a voice coil motor (VCM) assembly, the VCM assembly comprising:
a voice coil comprising a coil of wire,
a stiffener disposed inside the coil of wire,
a plurality of arms extending from a carriage, and
means for increasing a frequency of a second coil torsion mode of the VCM assembly, corresponding to a structural dynamics mode in which the carriage and the plurality of arms tilt in one direction and the voice coil tilts in an opposing direction, relative to a second coil torsion mode of a VCM assembly not otherwise comprising such means.

20. The HDD of claim 19, wherein:
the means for increasing the frequency of the second coil torsion mode of the VCM assembly is configured to bring the frequency of the second coil torsion mode of the VCM assembly closer to a frequency of a second coil torsion mode of the plurality of arms; and
the VCM assembly further comprises means for substantially balancing the center of mass of the VCM assembly about its axis of rotation.

* * * * *